United States Patent
Ehrlich et al.

(10) Patent No.: US 7,779,713 B2
(45) Date of Patent: Aug. 24, 2010

(54) TRANSMISSION DEVICE FOR MOTOR VEHICLES, GEAR ACTUATOR, AXIAL/RADIAL BEARING UNIT, AND PROCESS FOR MANUFACTURING A MOTOR VEHICLE TRANSMISSION DEVICE

(75) Inventors: Matthias Ehrlich, Buehl (DE); Norbert Esly, Buehl (DE)

(73) Assignee: LuK Lamellen und Kupplungsbau Bateiligungs KG, Buehl (DE)

( * ) Notice: Subject to any disclaimer, the term of this patent is extended or adjusted under 35 U.S.C. 154(b) by 805 days.

(21) Appl. No.: 11/482,259

(22) Filed: Jul. 7, 2006

(65) Prior Publication Data
US 2007/0017311 A1    Jan. 25, 2007

(30) Foreign Application Priority Data
Jul. 8, 2005   (DE) ................... 10 2005 0032 006

(51) Int. Cl.
*F16H 3/06* (2006.01)
*F16H 27/02* (2006.01)
*F16H 29/02* (2006.01)
*F16H 29/20* (2006.01)
*F16H 59/00* (2006.01)
*F16H 61/00* (2006.01)
*F16H 63/00* (2006.01)

(52) U.S. Cl. .................. 74/335; 74/89.23; 74/473.12
(58) Field of Classification Search .............. 74/335, 74/89.23, 473.12
See application file for complete search history.

(56) References Cited

U.S. PATENT DOCUMENTS

| | | | | |
|---|---|---|---|---|
| 5,992,254 A | * | 11/1999 | Machado | ............. 74/335 |
| 6,286,380 B1 | * | 9/2001 | Imao et al. | ............. 74/335 |
| 6,378,393 B1 | * | 4/2002 | Bates | ........... 74/473.18 |
| 6,470,764 B1 | * | 10/2002 | Yamaguchi et al. | ............. 74/335 |
| 7,026,770 B2 | * | 4/2006 | Hemphill et al. | ............... 318/9 |
| 7,222,554 B2 | * | 5/2007 | Hayashi et al. | ........... 74/473.12 |
| 7,435,924 B2 | * | 10/2008 | Schmitt-Walter et al. | . 219/86.33 |

FOREIGN PATENT DOCUMENTS

DE    102 06 561    10/2002
DE    103 16 434    10/2003

OTHER PUBLICATIONS

Translation to DE 10316434.*
Translation to DE 10316434 May 13, 2009.*

* cited by examiner

*Primary Examiner*—Tisha D Lewis
(74) *Attorney, Agent, or Firm*—Simpson & Simpson, PLLC

(57) ABSTRACT

The invention relates to a transmission device for motor vehicles, wherein the transmission device has several wheel sets for forming gears and wherein the transmission device has an internal gear shift and a gear actuator for actuating the internal gear shift for engaging and disengaging gears, and wherein the transmission device has a transmission housing in which the wheel sets provided for forming gears are held, wherein the gear actuator has two separate function modules, of which a first one is a drive module and of which a second is an actuating module, wherein the drive module has at least one, especially electronically-controlled, drive device like an electric motor and wherein during engaging and disengaging gears, the actuating module is in the power flow between the drive module and the internal gear shift and wherein the actuating module and the drive module are mounted separately on the transmission housing.

23 Claims, 7 Drawing Sheets

TRANSMISSION DEVICE FOR MOTOR VEHICLES, GEAR ACTUATOR, AXIAL/RADIAL BEARING UNIT, AND PROCESS FOR MANUFACTURING A MOTOR VEHICLE TRANSMISSION DEVICE

This patent claims priority of German patent application 10 2005 032 006.6, filed Jul. 8, 2005, which application is incorporated herein by reference.

FIELD OF THE INVENTION

The invention relates to a transmission device, and more particularly to a 3-shaft transmission device for motor vehicles, a gear actuator, an axial/radial bearing unit, and a process for manufacturing a motor vehicle transmission device.

BACKGROUND OF THE INVENTION

The invention relates to a transmission device, especially a 3-shaft transmission device for motor vehicles, a gear actuator, an axial/radial bearing unit, and a process for manufacturing a motor vehicle transmission device.

Motor vehicle transmission devices are known in various designs. Starting from conventional manual transmissions, for example, automated manual transmissions (AMT) have been produced, in which shifting processes are electronically controlled and initiated. In addition, transmissions have become known that have drive train branches connected in parallel, e.g., double clutch transmission (DCT) and parallel manual transmission (PMT). More modern motor vehicle transmission devices of the last type named are usually also electronically controlled.

In addition, various actuating devices for transmissions have become known. An example of a known actuating device is explained in DE 103 16 434 A1. The actuating device explained there is electromechanically designed and has a shifting motor for creating shifting movements and a selecting motor for creating selecting movements.

In motor vehicle transmission devices, frequently a differentiation is made between the internal transmission with its internal gear shift and an external gear shift that is also called an actuator—especially with designs that have outside power support and are designed with electric motors.

The internal transmission with its internal gear shift generally has the components forming the different ratios, like gear wheels and components that can be coupled with these gear wheels, like shafts. In this case, generally gear couplings or devices with the same or similar functions are provided by means of which couplings are produced for engaging gears and can be released for disengaging gears. This can be such that e.g., by means of such a gear coupling, a torsion connection can be created and released between a gear wheel of a gear set forming one gear and a shaft holding this gear wheel. The internal gear shift extends from these gear couplings to the interface to the external gear shift. This usually has several mechanisms that each extend from a gear coupling in the direction of the external gear shift. Various designs are known in which, for power transmission from the external gear shift to the internal gear shift, these mechanisms have a shift jaw or the like, which are housed e.g., in a shift rail or shifting fork. The external gear shift frequently has one or more parts, like shift fingers that can engage on these shift jaws to actuate them. This is frequently produced in such a way that such a shift finger or the like can be moved into a position for selection from which it can then be moved in a further movement that generally deviates from the selecting movement direction with respect to its direction for shifting.

It is also known that during gear changing processes in classically designed stepped motor vehicle transmission devices—starting from the old gear, the following three steps take place in time sequence: "disengaging the old gear"—"selection"—"engaging the target gear." In addition, motor vehicle transmission designs have become known in which the selecting movements can take place before the old gear is disengaged. In such designs it is provided, for example, that a main actuating element or shift finger is essentially responsible only for the engagement of gears and additional geometries take over the function of disengaging gears. In this case, especially so-called auxiliary actuating elements are used for the disengaging function. It is also known that the additional geometries, on one hand, are located e.g., on a central gear-shift shaft and on the other, on shift jaws that are provided on the named mechanisms and final output mechanisms and shift forks or shift rails, etc.

The disengaging geometries generally work in gates, in which the shift finger is not active. In this case, it can be provided that a fixed allocation between shift finger and disengagement geometry simultaneously represent an active gear lock. Design implementations of this solution are thus also designated as "active interlock."

In such an "active interlock," it is generally provided that the main actuating element or shift finger can be moved back without disengaging the gear, even with a gear engaged in a neutral position. The selecting movement is thereby possible before the gear is disengaged.

Examples of these types of designs are explained, e.g., in DE 102 06 561 A1 by the applicant.

In addition, so-called 3-shaft transmission devices are known, as well as the use of such transmission devices in motor vehicles. In them, a transmission input shaft turned toward the combustion engine is provided, as well as two main shafts that are connected in parallel, which—from the point of view of the combustion engine—are each arranged on the driven side of the drive shaft. These main shafts are sometimes also called output shafts or driven shafts in the state of the art. In this case, there can also be a transmission output shaft and driven shaft that is different from the two main shafts named and that—from the point of view of the combustion engine—is arranged on the driven side of the two main shafts. This transmission output shaft or driven shaft is frequently a differential or has a differential. Between this transmission output shaft or drive shaft and each of the main shafts, two sets of wheels are provided to form gears. From these main shafts and the respective shaft with which a gear is engaged, the torque is transferred in the direction of the differential. It is also known that such 3-shaft transmissions can be a component of double coupling transmissions (DCT) or parallel manual transmissions (PMT). In this case, it is provided that each of the two partial transmissions connected in parallel is designed in the manner of a 3-shaft transmission. This can be, for example, such that separate drive shafts and transmission input shafts are assigned to these two partial transmissions and the two partial transmissions share the two main shafts and thus also the driven shaft that may be present.

FIG. 1 shows an example 3-shaft transmission in schematic view that is known to the applicant—but possibly only in-house. 3-shaft transmission 400 has drive shaft 410, two main shafts, namely first main shaft 412 and second main shaft 414 and driven shaft 416.

First main shaft 412 and second main shaft 414 are arranged in the torque flow between drive shaft 410 and driven shaft 416—as long as the torque flow is transferred over the appropriate shaft. Driven shaft 416 is a differential or has a differential.

Several wheel sets 418, 420, 422 and 424 are provided for forming shafts. By means of wheel sets 418, 420, 422 and 424 each allow a torque to be transferred from drive shaft 410 to driven shaft 416—as long as an appropriate gear is engaged.

A part (wheel sets 418 and 420) of wheel sets 418, 420, 422 and 424 is arranged between drive shaft 410 and first main shaft 412 so that—as long as an appropriate gear is engaged—a torque can be transferred over first main shaft 412 by way of respective wheel set 418 and 420 between drive shaft 410 and driven shaft 416.

Another part (wheel sets 422 and 424) of wheel sets 418, 420, 422 and 424 is arranged between drive shaft 410 and second main shaft 414 so that—as long as a corresponding gear is engaged—a torque can be transferred from drive shaft 410 to driven shaft 416 by way of second main shaft 414 by way of respective wheel set 422 and 424.

For the engagement and disengagement of gears, gear couplings and sliding sleeves that are not shown in more detail are provided, by means of which the wheels and gear wheels that are assigned to wheel sets 418 and 420 and are held by first main shaft 412, can be coupled with first main shaft 412 for engagement of respective gears so that the corresponding gears are arranged so that they move in rotation with respect to first main shaft 412.

In a corresponding way, gear couplings and sliding sleeves are provided for the engagement and disengagement of gears (not shown in more detail) that are different from the ones mentioned above and by means of which the wheels and gear wheels that are assigned to wheel sets 422 and 424 and are held by second main shaft 414 can be coupled with second main shaft 414 so that they rotate with it for engagement of the respective gears and for disengaging the respective gears, can be uncoupled from second main shaft 414 so that the corresponding gear wheel is arranged so that it turns in rotation with respect to second main shaft 414.

In addition, internal gear shift 426 is provided, by means of which the gears can be engaged and disengaged. The previously discussed gear couplings are at least partially components of internal gear shift 426. In particular, sliding selves that are a component of the gear couplings are a component of internal gear shift 426.

Internal gear shift 426 also has a number of shift rails 428, 430, 432 and 434, that are especially a component of the end output mechanisms, which form internal gear shift 426.

In the design according to FIG. 1, this is such that two shift rails 428 and 430 and shift rail pair 436 are provided for engagement and disengagement of gears, which are assigned to first main shaft 412, and two shift rails 432 and 434 and shift rail pair 440 are provided for engagement and disengagement of gears, which are assigned to second main shaft 414.

In this case, it is especially provided that shift rail 428 is a component of an end output mechanism and shift rail 430 is a component of an end output mechanism different from this, wherein these end output mechanisms are each components of internal gear shift 426. In addition, it is especially provided that shift rail 432 is a component of an end output mechanism and shift rail 434 is a component of an end output mechanism that is different from it, wherein these end output mechanisms in turn are each components of internal gear shift 426, and wherein these two end output mechanisms are different from the two previously discussed.

In addition, gear actuator system 442 is provided, by means of which internal gear shift 426 and its shift rails 428, 430, 432 and 434 can be actuated to engage and disengage gears.

In the transmission construction according to FIG. 1, it is advantageous and necessary that in each case shift rail pair 436 is assigned to first main shaft 412 and shift rail pair 440 is assigned to second main shaft 414. Because of the position of drive shaft 410 between two main shafts 412 and 414, the positions of shift rail pairs 436 and 440 have a minimum distance from each other.

As already discussed, FIG. 1 shows a possible design of gear actuators 442—previously known at least to the applicant—that can be used for this construction type.

Gear actuators 442 essentially consist of actuator housing 444 including two motors 446 and 448, of which one is a selecting motor and one a shifting motor with shifting and selecting kinematics. In addition, gearshift shaft 450 is a component of gear actuator system 442. Gearshift shaft 450 has actuating elements 452 and 454 according to the known state of the art for an "active interlock."

It can be seen from FIG. 1 in the design shown there of gear actuator 442, that actuator housing 444 is provided. In addition, 3-shaft transmission 400 according to FIG. 1 has transmission housing 488 that is partially shown there. Actuator housing 444 is arranged outside transmission housing 488 and is an extension of gearshift shaft 450.

Also known to the applicant—but possibly only in-house—is an axial/radial bearing unit for mounting a rotary part, which can be used, e.g., in the design explained using FIG. 1 for holding the spindle. This axial/radial bearing unit has three thrust washers as well as two axial needle bearings. The three thrust washers are arranged axially next to each other, wherein one of the two axial needle bearings is positioned between each two axially adjacent thrust washers. The axially center thrust washer is tightly coupled with the part that rotates and the two axially outer thrust washers are each tightly coupled with a fixed environment opposite to which the part that rotates will be arranged, or vice versa. In one orientation of the axial direction, the axial support occurs by way of the center one as well as one of the two axially outer thrust washers and the one axial bearing arranged between these two thrust washers; in the other, opposite orientation of the axial direction, the axial support occurs by way of the center one and the others of the two axially outer thrust washers, as well as the other axial bearing arranged between these two thrust washers.

SUMMARY OF THE INVENTION

The invention is based on the object of a gear actuator and a transmission device with gear actuator that is safe in operation and can be well adapted to construction space relationships. It would also be desirable to find an opportunity, by means of which a part of a gear actuator, e.g., gearshift shaft, can be mounted with operational safety and cost effectively and adapted to the construction space.

According to the invention, a transmission device according to Claim 1 or according to Claim 13 or according to Claim 14 or according to Claim 16 or according to Claim 17 is especially suggested. A gear actuator according to the invention is the object of Claim 19. An axial/radial bearing unit according to the invention is the object of Claim 20. A method according to the invention is the object of Claim 22. Preferred designs are objects of the dependent claims.

According to the invention, a transmission device for motor vehicles is especially suggested. The transmission device has several wheel sets for forming transmission steps and gears. In addition, the transmission has an internal gear shift for engaging and disengaging gears, and a gear actuator for actuating this internal gear shift. In addition to this, the transmission device has a transmission housing, in which the wheel sets provided for forming gears are held.

In an especially preferred further development, the transmission device is designed as a 3-shaft transmission device. In this case, for example, it can be planned that a drive shaft is provided that—if the transmission is installed in the motor vehicles—is arranged on the combustion engine side and extends out of the transmission housing. In addition, in such a 3-shaft transmission device, it can be provided that the two main shafts of the transmission device that are frequently designated as driven or output shaft in the state of the art extend out of the transmission housing.

In addition, it is provided that the gear actuators have two separate function modules. A first of these two function modules is a drive module and the second of these two function modules is an actuating module. The drive module has at least one electronically controllable drive device. An electronically controllable drive device such as this can be e.g., an electric motor. For example, it can then be provided that such an electric motor is in signal connection with an electronic control unit, which controls the actuation of the electric motor. In an advantageous design, two electronically controllable drive devices are provided, of which one is provided for shifting and is thus also called shifting motor and the other is provided for selecting and thus is also called the selecting motor. The selecting motor and the shifting motor can each be electric motors. However, it is also possible that exactly one drive device, like exactly one electric motor, is provided which creates both drive movements for shifting and also drive movements for selecting. The actuating module and the drive module are arranged in such a way that the actuating module for engaging and disengaging gears is in the power flow between the drive module and the internal gear shift.

In this case, it is especially provided that the actuating module and the drive module form a kinematic interface for shifting is present between the actuating module and the drive modules. In addition, it is especially provided that the actuating module and the drive module form a kinematic interface for selecting is present between the actuating module and the drive module.

According to the invention, it is especially provided that the actuating module and the drive module are mounted separately on the transmission housing.

In an advantageous further development, the actuating module has a gear wheel segment, a first rack and several actuating elements. It is also advantageous that the actuating module also has a gearshift shaft. In this case, it is especially preferred that the actuating module has a gearshift shaft at one gear wheel segment, a first rack and several actuating elements.

The gear wheel segment discussed is especially used so that by way of it, forces can be transferred for shifting from the drive module to the actuating module. This can be, for example, such that the drive module has a second rack that engages in the gear wheel segment discussed. It can be provided that the gear wheel segment is provided with a projection for formation of a shift diagram.

The engagement and the arrangement of the second rack, as well as of the gear wheel segment, is advantageously such that an axial movement of the second rack causes a rotary movement of the gear wheel segment discussed and the gearshift shaft on which it is arranged.

The first rack is especially used so that by way of it, forces for selecting can be transferred or are transferred from the drive module to the actuating module. For example, for this purpose the drive module has a gear wheel or a first spur wheel continuation of a first internally geared wheel, which engages into this first rack of the actuating module. Turning of the gear wheel discussed and of the first spur wheel continuation then causes the first rack of the actuating module to be moved axially and thus the gearshift shaft is moved axially for selecting.

The previously discussed actuating elements of the actuating module are arranged in such a way that they also swivel during a swiveling of the gear wheel segment and the gearshift shaft. Of these actuating elements, at least one—but this can also be e.g., two or three or more—is a main actuating element and one or more can be an auxiliary actuating element.

Forces for engaging and disengaging gears can be transferred from the actuating module to the internal gear shift by way of the actuating elements. This can especially be such that, for engaging and disengaging gears, the actuating elements engage in shift jaws that are provided in shift rails in order to slide these shift rails appropriately for engaging and disengaging gears. However, in principle, it is also possible that instead of shift rails, shift forks or corresponding elements are provided. Shift rails, shift forks, or the like of this type are a component of the internal gear shift.

The main actuating element or elements previously discussed are especially used for engaging gears and the auxiliary actuating elements discussed are used exclusively for disengaging gears.

In particular, the main and auxiliary actuating elements work together in such a way that it is continuously ensured that only one gear can be engaged at a time in the same transmission or partial transmission. This is especially true if by means of a main actuating element, action occurs on one shift rail or one end output mechanism for engaging a gear, by means of the auxiliary actuating elements, it is ensured that all other gears of the same transmission or partial transmission are disengaged before the target gear is engaged by means of this main actuating element.

The main and auxiliary actuating elements are especially a component of an "active interlock" mechanism. For an example design of an "active interlock" mechanism, reference is explicitly made to the designs mentioned at the beginning and the references there. These designs and their characteristics that are referred to can be preferred further developments of the invention.

In an advantageous further embodiment, the drive module—and especially a selecting mechanism of the drive module—has a shift motor for providing the actuating force acting on the actuating module for shifting, the motor output shaft of which is provided with a second drive gearing, as well as a second internally geared wheel that is provided with a spur wheel continuation, as well as a spur wheel, a spindle, a second rack and a spindle nut provided with a second rack, a bearing component for mounting the spindle and an axial/radial bearing unit for mounting the spindle.

In this case the forces acting from the drive module onto the actuating module for shifting are especially provided at the kinematic interface for shifting. In an advantageous further development, it is provided that the second spur wheel continuation of the second internally geared wheel is offset axially with respect to the second internally geared wheel and its internal gearing.

In an especially advantageous further development, it is provided that a second drive gearing of the drive module provided on a motor output shaft of the shifting motor engages into the second internally geared wheel of the drive module, wherein the second spur wheel continuation provided on this second internal gear wheel engages in the spur wheel of the drive module and wherein this spur wheel is mounted on the spindle so that it rotates with it. In this preferred further development, it is also provided that this spindle is mounted so that it can rotate and fixed axially and that a second rack and a spindle nut provided with a second rack is arranged on the spindle, wherein for holding the spindle, on one side the bearing component discussed is provided, and on the other side the axial/radial bearing unit is provided. In this case, it is especially provided that the named spindle nut and the named second rack can be moved axially by turning the spindle. In this case, it is especially provided that this second rack of the drive module—as already discussed above—engages into the gear wheel segment of the actuating module and the gearshift shaft in such a way that an axial displacement of the second rack discussed causes a swiveling of the gear wheel segment, the actuating module and the gearshift shaft. As discussed, the actuating elements are advantageously connected with the gearshift shaft so they can rotate with it so that the swiveling of the gear wheel segment caused by the second rack can cause the shifting.

According to an advantageous further development, the transmission device has the transmission housing and actuator housing already discussed, which holds at least part of the components of the actuator, wherein the bearing component, by means of which the spindle discussed is mounted, is fastened on this transmission and on this actuator housing. In this case, it is especially provided that the bearing component is designed and fastened in such a way that it produces a bearing point at a distance from the limiting walls of the actuator housing and of the limiting walls of the transmission housing, and provides a bearing point for the spindle, by which the spindle is held. In an especially preferred design, an adapter component is also provided, wherein the exact position of the spindle can be adjusted with respect to the transmission and actuator housing by fastening of the bearing component with the adapter component. In this case, it is advantageously provided that the bearing component is secured against rotation by means of the adapter component.

For example, it can be provided that the bearing component is inserted into the actuator housing and secured by means of the adapter.

In a preferred design, the bearing component has the function of making possible an inner, open and precise bearing point and namely, especially for the spindle discussed. In this case it can be provided that this design simultaneously secures and completely secures the installation. In an especially preferred design, it is planned that the spindle is mounted at one end by means of the bearing component and on the other, opposite end is mounted by means of the axial/radial bearing unit.

The axial/radial bearing unit discussed, by means of which the spindle is mounted in the preferred design, especially preferably has a carrier that is open on one side, as well as exactly one axial needle bearing and exactly two thrust washers. In this case, the carrier is advantageously a plastic carrier.

In an especially preferred design of the axial/radial bearing unit, the axial needle bearing is positioned axially between the two thrust washers—especially contacting them. In this case, it can be provided that the package of these two thrust washers with the axial needle bearing arranged between them—preferably with a certain amount of play—is held on one side in a recess, like a groove, that is provided in the (plastic) carrier, and on the other in a recess that is formed around the circumference of the spindle. In this case, it is especially provided that the axial needle bearing extends around the spindle.

In a special design, the actuating module—and especially a selecting kinematic of the actuating module—has a selecting motor—especially for providing the actuating forces for selecting that act on the actuating module, as well as a first internally geared wheel, a pin and a first plate. In this case, the selecting motor has a motor output shaft that is provided with a first drive gearing. This drive gearing can be mounted directly in the motor output shaft or on a separate part, e.g., a separate sleeve(s) that is or are connected to that it (they) rotate with the motor output shaft. The first internally geared wheel has a first spur wheel set. This first spur wheel set is advantageously axially offset with respect to the first internally geared wheel. In this case, it is especially provided that the pin holds the first internally geared wheel. The first plate discussed is used especially for forming a bearing point for the pin discussed. It this case, it can be provided that the pin is mounted tightly on one side in the actuator housing, especially pressed in, wherein on the other side the first plate forms the bearing point for the pin. The first plate can be fastened radially and axially on the housing, especially due to its shape.

In an advantageous further development, it can be provided that the first drive gearing provided on the motor output shaft of the selecting motor engages in the first internally geared wheel, wherein the first internally geared wheel is held by the pin and, in fact, in an area that is arranged between the location of the pin, by which this is held tightly in the housing and the area in which the pin is held by means of the first plate. According to a preferred design, it is provided that a device for referencing and for forming a gate is provided between the drive module and the actuating module or between the actuating module and the transmission housing.

The device to permit a referencing and for forming a gate can—as discussed—be arranged e.g., between the drive module and the actuating module. For example, this can be such that on the actuating module and on the gearshift shaft a projection is provided that extends e.g., essentially radially. The projection can be designed, for example, such that it is limited radially outward on opposite sides, which run parallel, wherein one end placed in circumference direction of one limit is connected radially with this end of the other limit turned toward a limit in circumference direction on the outside by way of an arc. The projection is designed e.g., as a disk shape. The projection advantageously sits tightly on the gearshift shaft so that the attachment is also turned if the gearshift shaft is turned so that the gearshift shaft is blocked in rotation direction when the projection blocks. In each case, adjacent to the two opposite parallel sections of the outer limit of the projection, a second plate can be provided that is such that in specific axial positions of the gearshift shaft, these second plates block a turning of the gearshift shaft by the projection and the sections running parallel to them.

These opposite second plates that can also be connected as one piece are preferably provided with recesses, passages, or windows into which the projection can swivel in certain axial positions of the gearshift shaft so that a turning of the gearshift shaft is made possible. In this case, it is especially provided that the positions in which a turning is not possible are placed between the adjacent windows. In this case, the windows can be positioned in such a way that the actuating elements can work together with the shift rails for engaging and disengaging gears when the projection can swivel into a corresponding window. It is thus especially provided that by way of the projection of the second plates and the windows provided in them, it can be ensured that the gearshift shaft can be axially offset in a specific swivel position and a specific swivel position range—especially for selecting—and in specific axial positions—especially for shifting, while it cannot swivel into the axial positions lying in between and thus a shifting movement is prevented. It is also preferred that, when the projection dips into a window, the gearshift shaft cannot be moved axially or moved noticeably, so that a selecting movement is blocked in these positions.

It can be provided that the axial adjusting range of the gearshift shaft is limited by means of an end stop. This stop can especially be a stop on which the projection discussed stops if the gearshift shaft has reached its end position. This end stop can also be used, for example, to permit referencing and namely especially a referencing in selecting direction. For example, it can also be provided that then when the projection stops on this stop placed in axial direction, a turning of the gearshift shaft is not possible and no window is provided there. In this way, a referencing in shifting direction is also made possible.

Preferably it is provided that an electric motor, especially a shifting motor, is provided that is a component of the drive module and that the spindle is arranged essentially parallel to the motor output shaft of this shifting motor. The spindle discussed is at a distance from the motor output shaft of the electric motor perpendicular to its longitudinal extension direction. It is especially advantageously provided that the shift motor is arranged directly next to the spindle inside the shift kinematics. In this way, a short construction of the shift kinematics is possible, which partially extends into the inside of the transmission. In this case, it is especially provided that the spindle can be driven in rotation by means of the shift motor discussed.

In an advantageous design, the transmission device is a 3-shaft transmission device.

This 3-shaft transmission device advantageously has an input or "drive shaft", a first main shaft, and a second main shaft connected in parallel to the first one. In addition, the 3-shaft transmission device has an output or "driven" shaft and a differential or the like. It should be noted that in the state of the art, the main shafts discussed are often called output shafts.

In an advantageous design, the internal gear shift has shift rails. It can also have e.g., shift forks, etc. The internal gear shift can consist e.g., of several end output mechanisms, each of which has a shift rail. In particular, predetermined gears are assigned to each of the end output mechanisms and shift rails. These gears, to which the shift rails and the output mechanisms are assigned, can be actuated using the corresponding output mechanisms and shift rails.

Advantageously it is such that either exactly one gear can be actuated or exactly two gears can be actuated by way of an appropriate shift rail and an appropriate end output mechanism, wherein in particular mixed forms are also provided in such a way that two gears can be actuated using individual end output mechanisms and shift rails and exactly one gear can be actuated by way of one or more others. This can also depend on the number of gears that the transmission or partial transmission has.

The transmission device is preferably an automated manual transmission (AMT), a double coupling transmission (DCT) or a parallel manual transmission (PMT).

It is especially preferably provided that the actuation as a rotation moment from the gear actuator on the shift rails is converted into a translational movement.

Preferably the gear actuator is mounted laterally on the transmission.

In addition, in particular a transmission device according to Claim 13, Claim 14, Claim 16 or Claim 17 is suggested. A gear actuator according to the invention is the object of Claim 19.

Each of the designs suggested by these claims can be further developed, for example, or have further developed characteristics that have already been explained. This relates not only to the transmission devices according to the invention, but especially also on the gear actuator according to the invention and its operating module and its transmission module.

Preferably the drive module of the gear actuator according to the invention has at least one electric motor. It can be provided that the drive module has a selecting motor and a shifting motor, wherein these motors are electric motors. The drive module advantageously has an actuator housing. In this case, it can be provided that the actuating module is not held or mounted—especially directly—on the actuator housing. There is at least one kinematic interface at which these two modules interact, like kinematic interface for selecting and kinematic interface for shifting.

According to the invention, an axial/radial bearing unit for parts turned in rotation like spindles or shafts is also suggested according to Claim 20. The axial/radial bearing unit has exactly one axial needle bearing and exactly two thrust washers. Preferably the axial/radial bearing unit has a carrier that is open on one side, which can be e.g., a plastic carrier.

Preferably, the axial needle bearing is arranged axially between the two thrust washers and is in contact with these two thrust washers. The part turned in rotation, i.e., especially the spindle or shaft, preferably extends through the two thrust washers and the axial needle bearing.

The two thrust washers and possibly the axial needle bearing, for example, extend into the carrier with an area that lies axially on the outside. This is especially such that radially there is play between the thrust washers, the axial needle bearing, the plastic carrier and the base of a recess in which the thrust washers and the axial needle bearing extend in, with an area that lies radially on the outside.

In addition, it is especially provided that there is also a certain play between the thrust washers and the wall sections delimiting the recess so that the thrust washers and the axial needle bearing can rotate. The thrust washers and the axial needle bearing can also rotate with respect to the spindle or shaft that rotates. In an especially preferred design forces, and namely especially axial forces, can be transferred from the part turned in rotation by way of the unit from the two thrust washers and the axial needle bearing, onto the plastic carrier, wherein a friction connection is thus formed. This can be such that, e.g., during transfer of the forces, one of the two thrust washers is connected by friction connection to the part turned in rotation and the other of the two thrust washers is connected with a friction connection with the plastic carrier. In the part turned in rotation, a recess is especially also formed, in which the two thrust washers with a radial inner area, in which a passage for the spindle is formed, engage and namely in such a way that they are secured axially.

A recess in the spindle such as this can be designed e.g., in such a way that there is a shoulder on the spindle and on the side turned away from the shoulder, a sleeve or a shaft nut or similar part, which forms a second axial limit of the recess in addition to the shoulder.

Besides that, the axial/radial bearing unit can also be further developed as has previously been explained and will also be explained in the following.

According to the invention, a method according to Claim 22 is especially suggested.

This method is a method for manufacturing a transmission device for a motor vehicle, and preferably for manufacturing a transmission device according to the invention. The transmission device that can be manufactured using this method, can be e.g., a transmission device according to the invention. For example, this transmission device is a three-shaft transmission device. The transmission device has several sets of wheels for forming gears. For engaging and disengaging gears, an internal gear shift is provided and a gear actuator for actuating the internal gear shift. The transmission device has a gear housing, in which wheel sets are held that are provided for forming gears. The method first has the steps of "producing an actuating module" and "producing a drive module." These two steps can basically occur in any time sequence, i.e., also in parallel, overlapping in time, for example.

According to the method, it is also provided that the actuating module is installed on the transmission housing. With respect to example designs of this actuating module and this drive module, reference is made to the preceding designs or also to the following.

According to the method, it is also provided that the drive module will be installed on the transmission housing. The installation of the drive module occurs after the actuating module is installed. Thus the actuating module and the drive module are held separately on the transmission housing.

In contrast to this, in known devices from the state of the art, it is provided that the gear actuator is essentially completely assembled and then installed or mounted in the transmission housing. According to the state of the art, this occurs in such a way that all the parts of the gear actuator are installed in an actuator housing and the actuator housing is then mounted on the transmission housing, e.g., bolted to it.

In the state of the art, this type of assembly can lead to the fact that very large openings in the transmission housing are necessary in order to make it possible for installation capability to be ensured and for the required interfaces of the gear actuator to the internal gear shift are provided.

Because of the fact that, according to the invention, two separate modules of the gear actuator are also mounted separately on the transmission housing, it can be made possible, e.g., that the actuating module and a gearshift shaft with actuating elements arranged on it and possibly other components, e.g., of the type described above, can essentially be introduced axially through a corresponding opening into the transmission housing and mounted there. Perpendicular to this, for example, the drive module with one or two electric motors, e.g., selecting motor and shifting motor, and transmission mechanical components that extend to the interface of the drive module for selecting and for shifting, can be installed perpendicular to the longitudinal extension of the gearshift shaft.

It can especially also be provided that—as discussed—the actuating module is introduced essentially axially through an opening in the transmission housing and another opening is provided in the transmission housing, on which the drive module is installed so that it is possible to produce the corresponding interfaces to the actuating module.

In an advantageous design, the actuating module is installed front of the drive module on the transmission housing. However, this can also be reversed.

These and other objects and advantages of the present invention will be readily appreciable from the following description of the preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE PREFERRED EMBODIMENT

Figure 1:
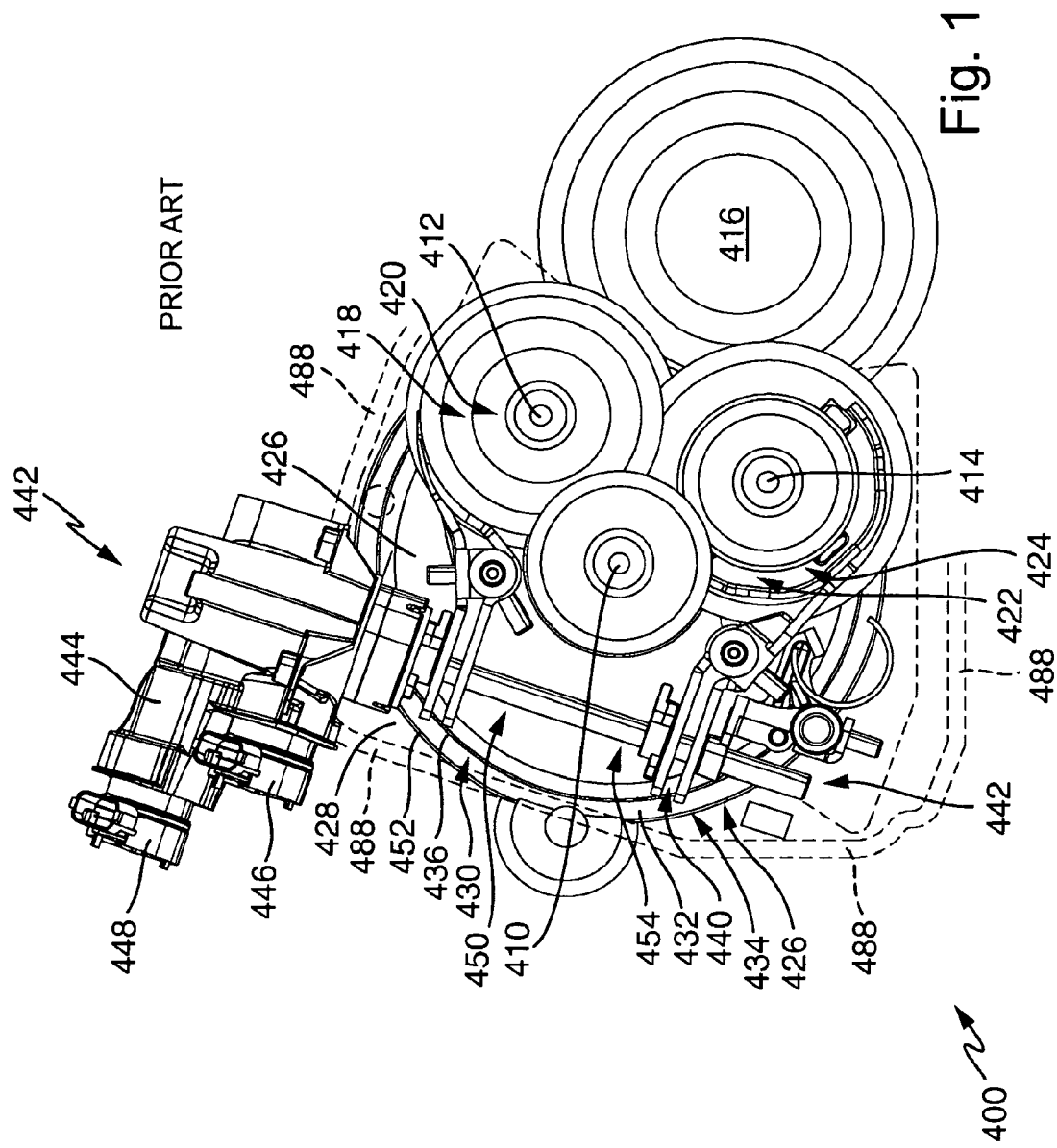
FIG. 1 shows a transmission device that is known to the applicant that is designed as a 3-shaft transmission device with a gear actuator.

FIGS. 2 to 10 show an example of a 3-shaft transmission according to the invention and example 3-shaft transmission device 1 according to the invention with example gear actuator 42 according to the invention in schematic views and partial views.

3-shaft transmission device 1 has drive shaft 10, first main shaft 12, and second main shaft 14. 3-shaft transmission device 1 can be installed in a drive train of a motor vehicle in such a way that drive shaft 10 is arranged on the side turned toward the combustion engine and main shafts 12 and 14 are arranged on the side turned toward the drive axles of the vehicle. In addition, there is driven shaft 16, which is different from main shafts 12 and 14 and is arranged in the torque flow on the side of main shafts 12 and 14 turned away from drive shaft 10. Driven shaft 16 can be e.g., a differential or a shaft device with differential. In a variation, driven shaft 16 can also be seen as a shaft that is not assigned to 3-shaft transmission device 1.

3-shaft transmission device 1 also has several wheel sets 18, 20, 22 and 24 for forming gears. The number of wheel sets corresponds to the number of gears that can be engaged; it is especially provided that one reverse gear and several forward gears, e.g., four forward gears or five forward gears or six forward gears or seven forward gears can be shifted. However, the number of gears that can be shifted can also deviate from the numbers mentioned above.

In the embodiment example, it is provided that several wheel sets 18 and 20 are assigned to first main shaft 12 and several wheel sets 22 and 24 are assigned to second main shaft 14. One of the gear wheels of each of respective wheel sets 18 and 20 that are assigned to first main shaft 12, is held by the first main shaft. This is such that the corresponding gear wheel is assigned to first main shaft 12 and can be coupled by means of gear couplings, sliding sleeves or the like so it rotates with first main shaft 12 for engaging a gear.

In a corresponding manner, in each case one gear wheel of wheel sets 22 and 24 that are assigned to second main shaft 14 is held by second main shaft 14 and is arranged there so that it can move with respect to second main shaft 14. This gear wheel that is mounted so that it rotates can be coupled by means of gear couplings, sliding sleeve or the like so it rotates with second main shaft 14 for engaging a gear.

3-shaft transmission 1 has internal gear shift 26.

Shift rails 28, 30, 32 and 34 provided are especially a component of internal gear shift 26. One part of shift rails 28, 30, 32 and 34—in the embodiment these are shift rails 28 and 30—is provided for engaging and disengaging gears that are assigned to first main shaft 12 and a part of shift rails 28, 30, 32 and 34 mentioned—in the embodiment example these are two shift rails 32 and 34—is provided for engagement and disengagement of gears that are assigned to second main shaft 14.

3-shaft transmission device 1 also has an actuating device, gear actuator 42. Gear actuator 42 comprises two separate function modules, of which one is actuating module 56 and the other of which is drive module 58.

Figure 2:
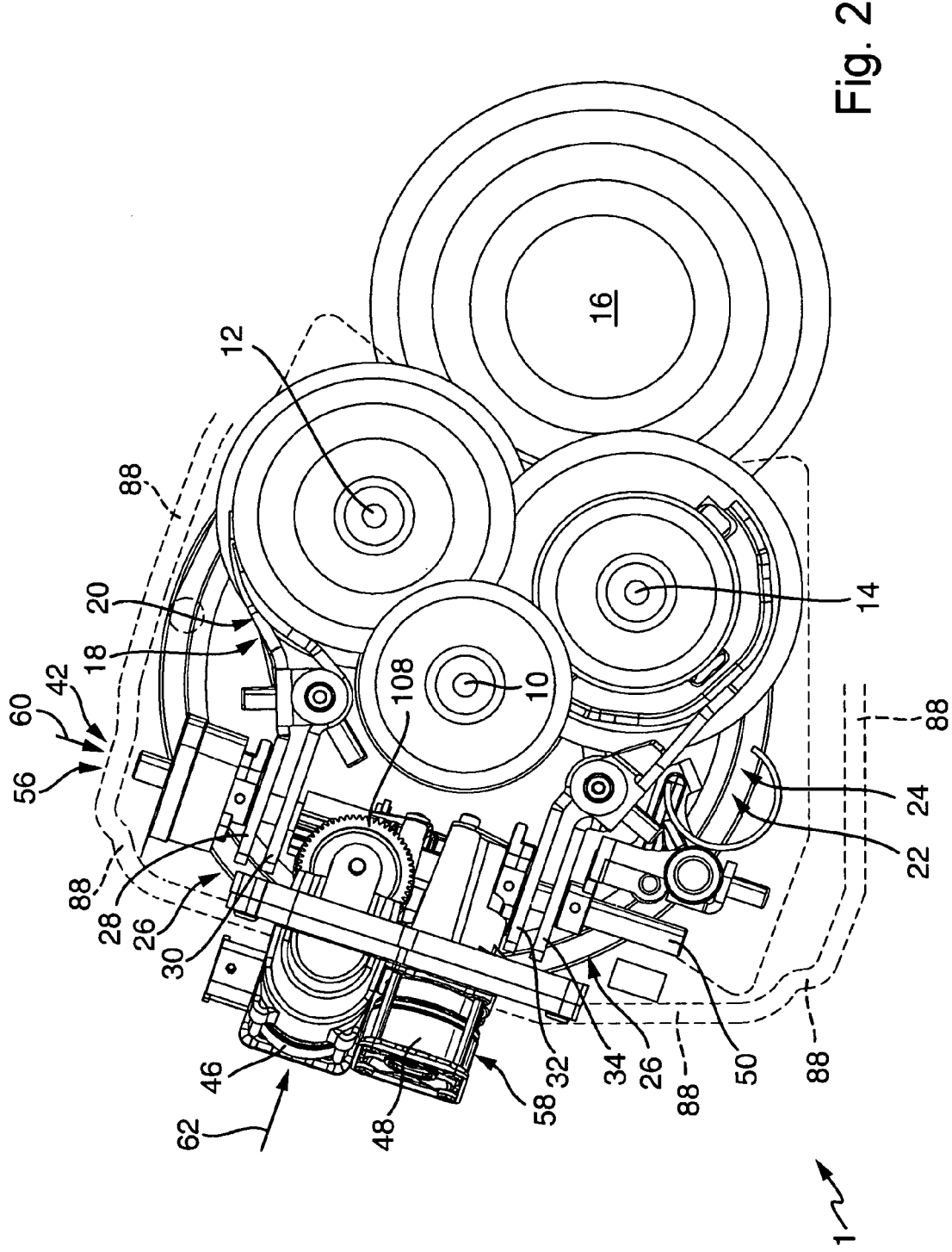
FIG. 2 shows a preferred embodiment of a transmission device according to the invention that is designed here as a 3-shaft transmission device with a preferred embodiment gear actuator according to the invention.

FIG. 2 shows an example of a design according to the invention in assembled state. In this case, gear actuator 42 is installed on transmission housing 88 of 3-shaft transmission 1.

The assembly device of the two individual components "actuating module 56" and "drive module 58" are schematically symbolized by arrows 60 and 62, wherein these can preferably only be assembled in the sequence indicated. Arrow 60 here symbolizes the installation direction of actuating module 56 and arrow 62 symbolizes the assembly direction of drive module 58.

Figure 3:
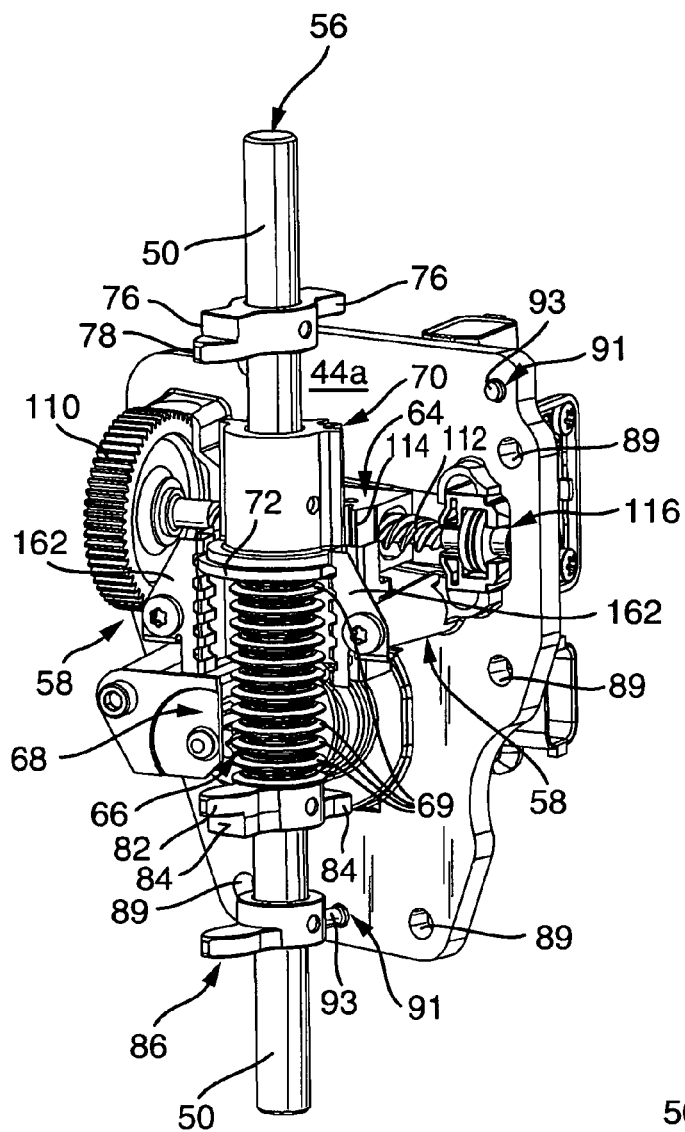
FIG. 3 shows the functional unit of the gear actuator in the design shown in FIG. 2 in a separate view, wherein this gear actuator consists of the individual components "actuating module" and "drive module"
Figure 4:
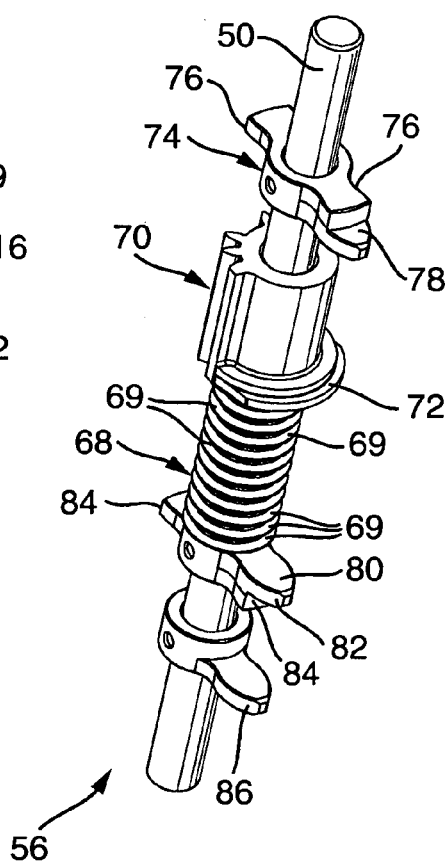
FIG. 4 shows the actuating module of the gear actuator shown in FIG. 3.

FIG. 3 separately shows the function unit of gear actuator 42, which consists of the two individual components "actuating module 56" and "drive module 58". Actuating module 56 of gear actuator 42 shown in FIG. 3 and the components of actuating module 56 are shown in FIG. 4.

In the transition area between actuating module 56 and drive module 58 a kinematic interface exists for shifting and a kinematic interface exists for selecting. The kinematic interface for shifting is kinematic interface for shifting 64 in FIG. 3 and the kinematic interface for selecting is kinematic interface for selecting 66 in FIG. 3.

In the following—especially with reference to FIG. 4—the components of actuating module 56 will now be dealt with:

Actuating module 56 has gearshift shaft 50 that is provided with first rack 68. First rack 68 extends in longitudinal direction of gearshift shaft 50 and will be formed by several teeth 69 at a distance from each other in longitudinal direction of gearshift shaft 50—e.g., closed on the circumference. First rack 68 is provided for selecting kinematics 101. It forms a component of the interface for kinematic interface for selecting 66 between actuating module 56 and drive module 58. Actuating module 56 also has gear segment 70 with projection 72. Projection 72 is used in order to allow a referencing of the shifting diagram and as a component of a shift gate. Instead of projection 72 of this type, however a differently designed part can be provided as an alternative, by means of which a referencing of the shifting diagram and a shift gate is formed. However, it can also be alternatively provided that actuating module 56 is free from a part such as that, like projection 72.

Gear segment 70 is arranged in such a way that the teeth in the circumference direction of gearshift shaft 50 are at a distance from each other and each extends essentially in longitudinal direction of gearshift shaft 50. Gear segment 70 is provided for the shift kinematics 100. Gear segment 70 is a component of interface 64 between actuating module 56 and drive module 58 for shifting.

Actuating module 56 also has actuating elements 74, 80 and 86. By means of actuating elements 74, 80 and 86, shift rails 28, 30, 32 and 34 can be acted upon for engaging and disengaging gears.

Actuating element 74 is a combined actuating element made up of one or more auxiliary actuating elements 76 and one main actuating element 78. Actuating element 74 can be designed e.g., as one piece.

Actuating element 80 is also a combined actuating element made up of main actuating element 82 and one or more auxiliary actuating elements 84. Actuating element 80 can be designed e.g., as one piece.

Main actuating elements 78 and 82 and auxiliary actuating elements 76 and 84 discussed are components of an active interlock mechanism. With respect to this, reference is made to the introductory explanations of active interlock. For example, in the design according to the embodiment example, the active interlock can be further developed as was explained at the beginning in the present disclosure and namely was also explained especially with reference to known designs.

Main actuating elements 78 and 82 are designed as shift fingers. Auxiliary actuating elements 76 and 84 are designed as double wings.

The transmission with drive shaft 10 as the input shaft and main shafts 12 and 14, as well as internal gear shift 26, has transmission housing 88, which is represented schematically and partially in FIG. 2 by two dotted lines schematically indicating wall limits. In addition gear actuator 42 can have actuator housing 44, which can also have e.g., a—possibly additional—support function for components of gear actuator 42.

Figure 5:
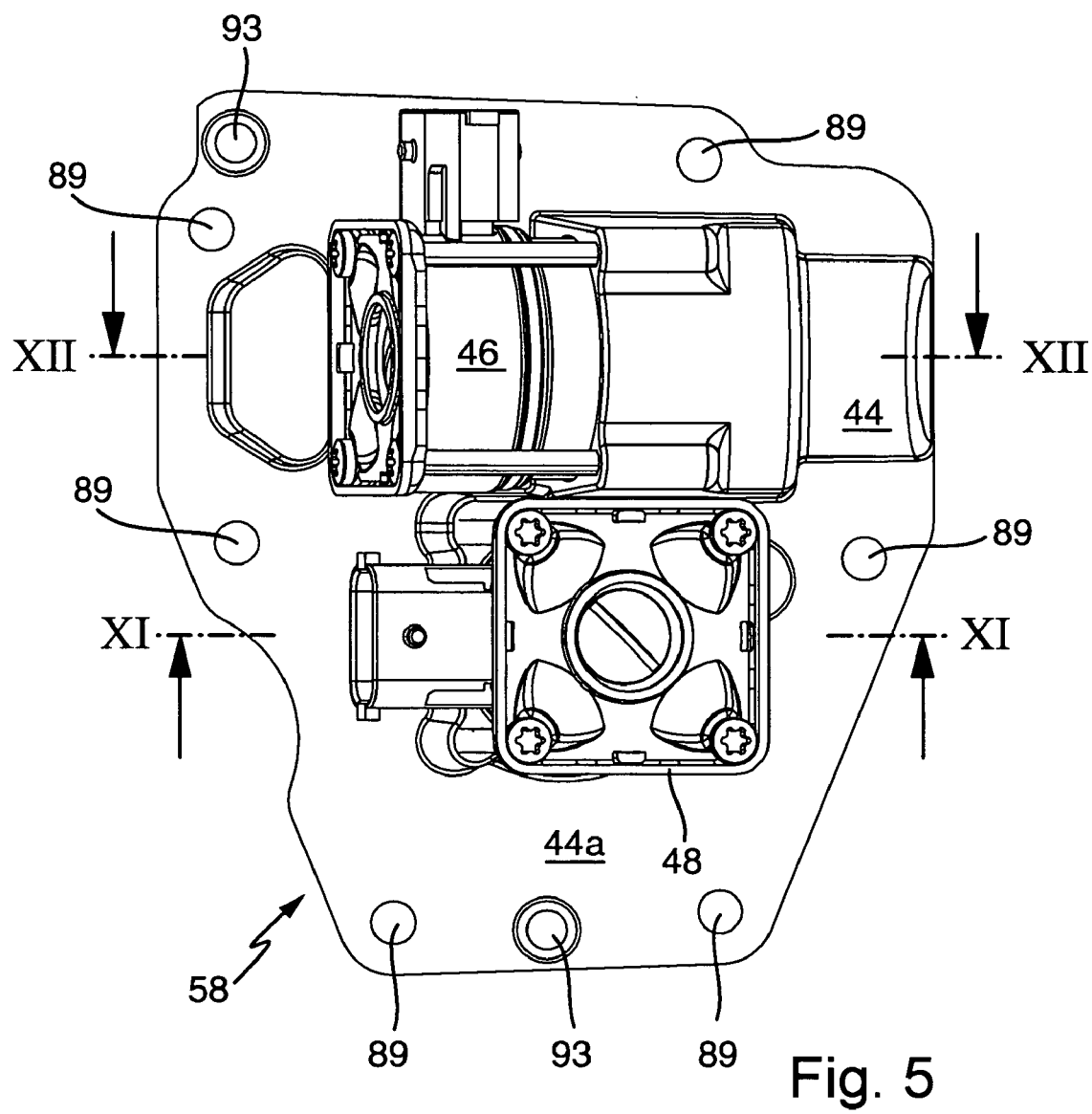
FIG. 5 shows a view of the shifting motor and the selecting motor of the gear actuator of the design shown in FIG. 2 from the outside of the transmission housing.

FIG. 5 shows a view of shifting motor 46 and selecting motor 48 from the outside of the transmission housing (see FIG. 2).

It can also be seen in FIG. 5 that actuator housing 44 has continuation 44a, which is designed here as a plate. Continuation 44a can be designed as one piece with actuator housing 44, for example. Instead of plate-shaped continuation 44a, for example, a hood-shaped continuation can be provided. However, it can also be provided, for example, that actuator housing 44 has a modified shape and has no continuation.

Continuation 44a has several first through-holes 89 for holding screws. By means of screws 91, actuator housing 44 and drive module 58 are installed on transmission housing 88. Instead of a fastening device of this type for drive module 58, however, a differently designed fastening device can also be provided for drive module 58.

It can be provided that actuator housing 44 and its continuation 44a has several, especially two, second through-holes 93 for holding centering pins 91. By means of centering pins 91, a play-related deviation can be reduced or prevented between the target and the actual position of drive module 58, actuator housing 44 and continuation 44a on transmission housing 88. However, instead of this, for example, centering shoulders or the like can be provided.

Actuating module 56 is mounted separately from drive module 58 on transmission housing 88. Advantageously separate openings in transmission housing 88 are provided for actuating module 56, on one hand, and for drive module 58, on the other.

It can be provided that actuator housing 44 and continuation 44a are simultaneously used as a cover for at least partial closing of the opening in transmission housing 88, through which drive module 58 is installed in transmission housing 88. Drive module 58 is—as shown in FIG. 2 for example—is positioned partially inside and partially outside transmission housing 88. Actuator housing 44 and continuation 44a and the cover discussed can be installed or fastened on transmission housing 88, e.g., so that it can be removed.

Actuating module 56 and gearshift shaft 50 are positioned completely in transmission housing 88. However, alternatively it can also be provided that actuating module 56 and gearshift shaft 50 extend out of transmission housing 88 on one or both sides of gearshift shaft 50.

Actuating module 56 and gearshift shaft 50 are mounted so that gearshift shaft 50 can slide axially and move in rotation. Actuating module 56 is mounted on transmission housing 88. To do this, it can also be provided that on transmission housing 88, one or more continuations are mounted that are different from continuation 44a and are mounted on actuating module 56; this can be advantageous, especially considering that gearshift shaft 50 is mounted so that it can be slid axially. Such a continuation can be mounted or formed on transmission housing 88 or walls or one wall of transmission housing 88 and for example extend from there toward the inside.

It is thus especially provided that actuating module 56, on one hand, and drive module 58, on the other, are mounted separately on transmission housing 88. This is especially so that basically actuating module 56 can be installed on transmission housing 88, without drive module 58 being installed on transmission housing 88 and vice versa. However, it should be noted that this is intended to mean that actuating module 56, on one hand, and drive module 58, on the other, are installed on transmission housing 88. What has been mentioned above especially is not intended to means that actuating module 56 or drive module 58 can be used as gear actuator 42; rather it is true that that both actuating module 56 as well as drive module 58 belong to gear actuator 42.

In contrast to the design known according to the state of the art, in the embodiment example according to FIGS. 2 to 10—and this case involves one or more aspects that make up a difference from the state of the art—gear actuator 42 is divided into two separate function modules, namely drive module 58 and actuating module 56, wherein it is especially provided that their function as a whole is only possible with appropriate transmission peripherals. Because of this—and especially at least in further developments—construction space areas can be used in more varieties of ways. The fact that the function as a whole is only possible with appropriate transmission peripherals is especially to be understood to mean that the appropriate transmission peripherals are necessary so that the function of the actuator is ensured. In this case, it is especially provided that without corresponding transmission peripherals the function would not be ensured since drive module 58 and actuating module 56 would not be held adequately. In contrast to this, in known designs it is possible that the gear actuator produces its output movement by means of at least one electric motor, by means of which an internal gear shift can be actuated for selecting and switching, without the gear actuator being installed on the transmission or on the transmission housing.

Figure 6:
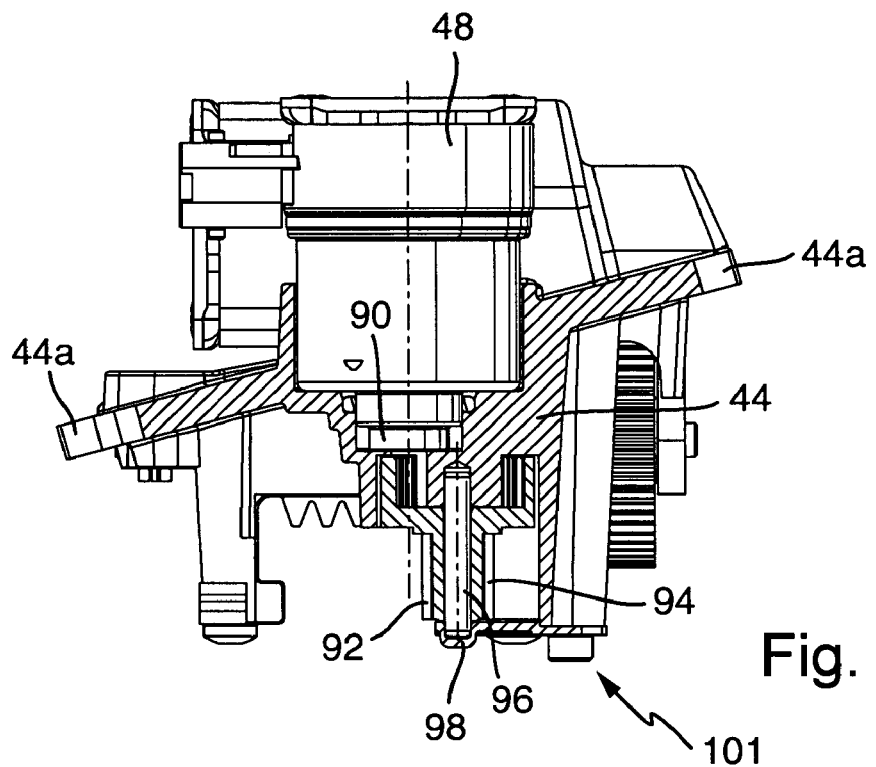
FIG. 6 shows a cross section along the line VI-VI from FIG. 5.
Figure 7:
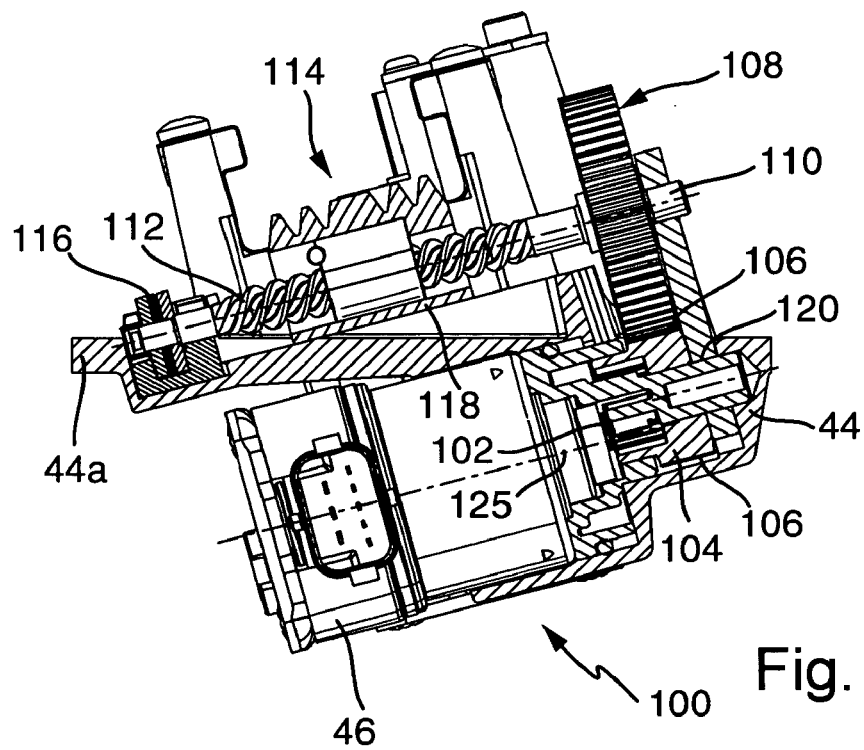
FIG. 7 shows a cross section along line VII-VII from FIG. 5.
Figure 8:
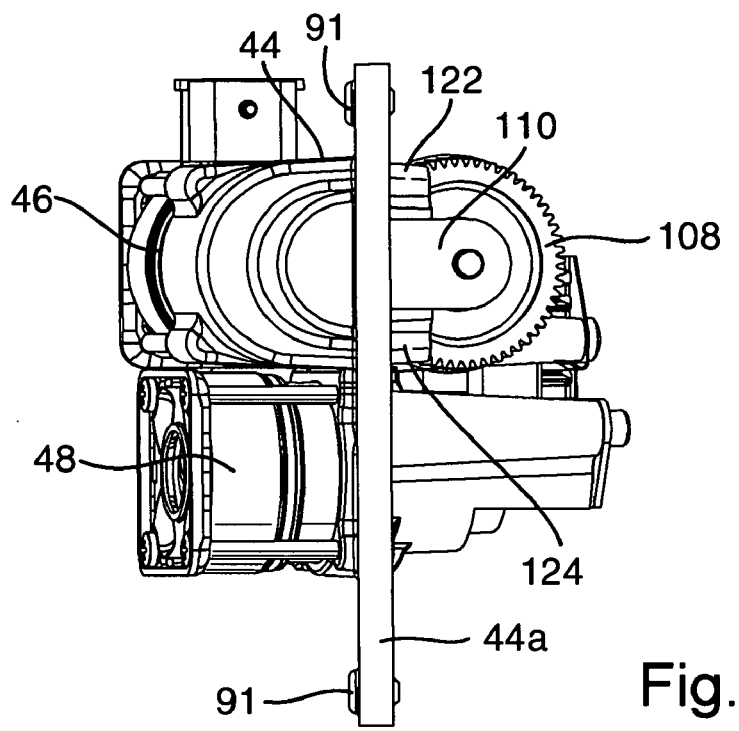
FIG. 8 shows another view of the drive module that is essentially a view of the design according to FIG. 3 from the right, which—related to FIG. 3—is slightly turned in the image plane.

FIG. 6 shows a cross section along line VI-VI from FIG. 5 and FIG. 7 shows a cross section along line VII-VII from FIG. 5. The cross section view according to FIG. 6 is a cross section through selecting kinematics 101 of gear actuator 42 and the cross section according to FIG. 7 is a cross section through shift kinematics 100 of gear actuator 42.

Selection kinematics 101 shown in FIG. 6 has selecting motor 48 with first drive gearing 90, first internally geared wheel 92 with first spur wheel continuation 94, pin 96, as well as first plate 98. Selecting motor 48 is preferably an electric motor. First drive gearing 90 that is provided on selecting motor 48, can be mounted directly in the motor output shaft of selecting motor 48 or as a separate geared part on this motor output shaft so that it turns with it.

First internally geared wheel 92 with first spur wheel continuation 94 is such that it forms an inner gearing and, for forming first spur wheel continuation 94, forms an axially offset outer gearing. First drive gearing 90 of selecting motor 48 engages in the inner gearing discussed and can thus drive first internally geared wheel 92 and thus its first spur wheel continuation 94. First internal gear wheel 92 with its first spur wheel continuation 94 is in engagement with first rack 68 of actuating module 56. This is such that first spur wheel continuation 94 engages into first rack 68 and thus by turning first internally geared wheel 92 and its first spur wheel continuation 94, gearshift shaft 50 can be moved axially into first rack 68 using the engagement of first spur wheel continuation 94.

First internally geared wheel 92 is mounted on pin 96.

Gear actuator 42 has actuator housing 44. In actuator housing 44, pin 96 is mounted or pressed in on one side. On the other side, first plate 98 forms the bearing point for pin 96. First plate 98 is fastened radially axially on actuator housing 44, due to its selected shape.

Thus a bearing function for pin 96 is produced by first plate 98. Pin 96 holds first internally geared wheel 92 next to first spur wheel continuation 94 so it can move in rotation.

Shifting kinematics 100 (see FIG. 7) has shifting motor 46 with second drive gearing 102, second internally geared wheel 104 with second spur wheel continuation 106, spur wheel 108, bearing component 110, spindle 112, second rack 114 and axial/radial bearing unit 116.

Second drive gearing 102 of shifting motor 46, which is preferably an electric motor, can be installed in the motor output shaft of shifting motor 46. However, it can also be provided that second drive gearing 102 is installed, e.g., in a sleeve that is connected so that rotates with the motor output shaft of shifting motor 46.

Second drive gearing 102 acts on the inner gearing of second internally geared wheel 104, so that by means of second drive gearing 102 and by means of shifting motor 46, second internally geared wheel 104 can be driven in rotation. On second internally geared wheel 104, second spur wheel continuation 106 is arranged so it is axially offset with respect to inner gearing of second internally geared wheel 104.

Second spur wheel continuation 106 discussed of second internally geared wheel 104 engages in spur wheel 108 so that by means of second spur wheel continuation 106 and by means of shifting motor 46, spur wheel 108 can be driven in rotation.

Spur wheel 108 rests on spindle 112 so that they turn together, so spindle 112 is turned along with spur wheel 108 when spur wheel 108 turns.

On spindle 112, second rack 114 and spindle nut 118 rest, on which second rack 114 is mounted. In this case, spindle nut 118 can be designed to form one piece with second rack 114 or be fastened on spindle nut 118 as a separate part.

Spindle 112 can essentially rotate and is essentially mounted so that it is fixed axially so that by turning spindle 112, an axial migration of nut 118 and second rack 114 can be caused. It can also be provided that an axial guide is provided additionally for guiding spindle nut 118 and second rack 114.

Second rack 114 is in engagement with gear segment 70, so that second rack 114, as well as gear segment 70, are components of kinematic interface for shifting 64 between actuating module 56 and drive module 58.

Spindle 112 is mounted, on one side, by means of bearing component 110 and on the other, by means of axial/radial bearing unit 116. In the design according to FIG. 7, bearing component 110 and axial/radial bearing unit 116 are arranged essentially in area of the two opposite distal ends of spindle 112.

In this embodiment example, bearing component 110 is necessary and advantageous since because of the special design and assembly sequence of "spindle 112" sub-module, a radial bearing point for spindle 112 that lies at a distance from actuator housing 44 will be necessary and advantageous. The exact positioning of spindle 112 to actuator housing 44 is adjusted by means of the positioning of bearing component 110 with adapter component 120. The torque is supported with frames 122 and 124 on bearing component 110 (see FIG. 8).

By means of bearing component 110, for example, a situation can be achieved in which an internal, open and precise bearing point will be possible. Such a design can also simultaneously ensure and permit assembly.

As FIG. 7 shows, spindle 112 is essentially parallel and at a distance, perpendicular to its longitudinal extension direction, to the motor output shaft of shifting motor 46, by means of which spindle 112 can be driven. The longitudinal axis of the motor output shaft of shifting motor 46 and the axle concentric to this is indicated schematically in FIG. 7 by dotted line 125.

According to the design in FIG. 7 of shifting kinematics 100, shifting motor 46 is arranged directly adjacent to spindle 112. For example, a short construction of shifting kinematics 100 can be achieved, which e.g., also partially extends into the transmission interior.

It can be provided that shifting motor 46, by means of which spindle 112 can be driven is placed—preferably completely—axially between the opposite ends of spindle 112.

Figure 9:
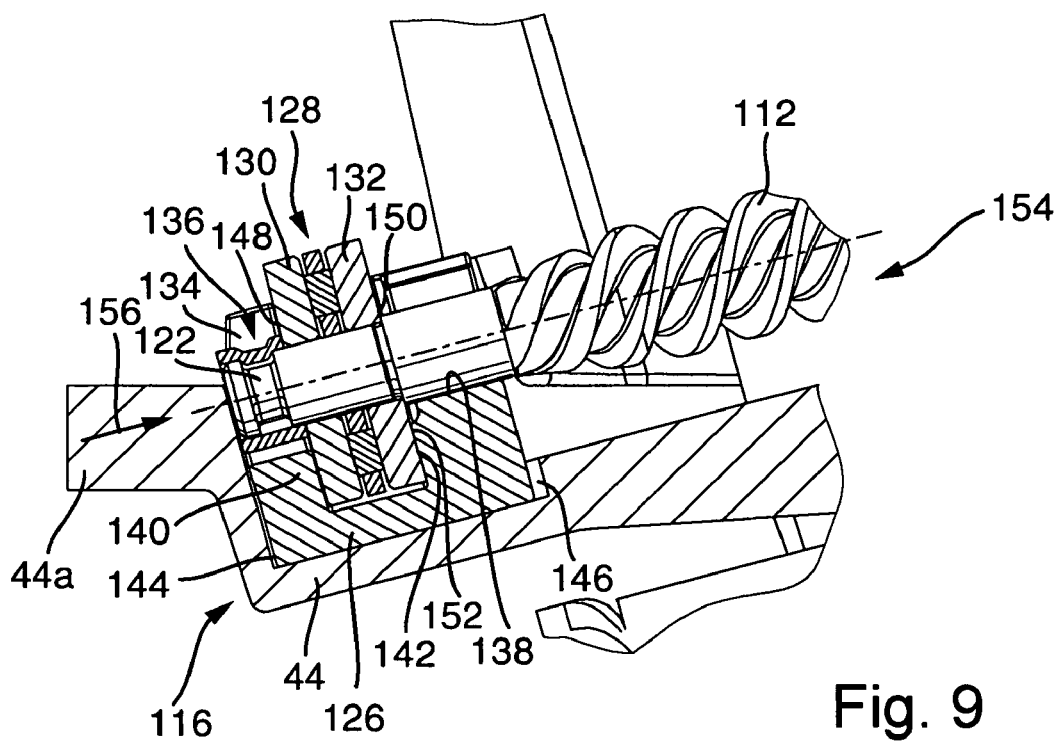
FIG. 9 shows an enlarged cut-out from FIG. 7 in the area of the axial/radial bearing unit; and, FIG. 10 shows an enlarged, slightly turned cut-out from FIG. 3.

FIG. 9 shows an enlarged cutout from FIG. 7 in the area of axial/radial bearing unit 116.

Axial/radial bearing unit 116 has a carrier open on one side, especially plastic carrier 126 open on one side, axial needle bearing 128, first thrust washer 130, second thrust washer 132,—especially crimpled—sleeve 134, groove 136 installed in spindle 112, radial bearing running surface 138, axial support surfaces 140 and 142 and housing support surfaces 144 and 146.

In the area of the outer shroud of spindle 112, recess 148 is formed. Recess 148 is limited radially inside by spindle 112 and in axial direction, on one side by shoulder 150 of spindle 112 and on the other, by sleeve 134. Axially between these axial limitations of recess 148, thrust washers 130 and 132 that are at a distance from each other axially are each held. Axially between two thrust washers 130 and 132, axial needle bearing 128 is arranged and held, which extends around spindle 112.

Carrier 126, which is especially a plastic carrier, has recess 152 on its side turned toward spindle 112. A radially outer area of thrust washers 130 and 132 extends into recess 152.

In addition, one section of axial needle bearing 128 is placed between these radially outer areas of thrust washers 130 and 132. The radial bearing force according to the areas is shown in FIG. 9 by white arrows surrounded by black. The radial bearing force only acts essentially in the lower area of spindle 112 in FIG. 9.

In the following, how the axial bearing force can be supported alternately by way of axial/radial bearing unit 116 will now be explained.

However, first it should be noted that thrust washers 130 and 132 are arranged so that they can each move in rotation with respect to spindle 112 and move in rotation with respect to carrier 126.

If an external force that basically acts in the direction of arrow 154 acts on spindle 112, spindle 112 presses with its shoulder 150 on second thrust washer 132. The load of spindle 112, which acts axially on second thrust washer 132, stresses second thrust washer 132 axially, which thereby stresses axial needle bearing 128, which in turn stresses first thrust washer 130 axially. First thrust washer 130 supports itself, in the area of axial support surface 140, on carrier 126, which in turn supports itself in the area of housing support surface 144 on actuator housing 44. Under the load conditions discussed, a friction connection essentially develops between spindle 112 and second thrust washer 132 in the area of shoulder 150 of spindle 112 so second thrust washer 132 essentially turns with spindle 112; in addition a friction connection develops essentially between first thrust washer 130 and carrier 126 in the area of axial support surface 140 so first thrust washer 130 is essentially resting—as is carrier 126.

If spindle 112 now exercises an axial load according to the direction of arrow 156, spindle 112 supports itself axially by way of sleeve 134 on first thrust washer 130. First thrust washer 130, in turn, supports itself axially on axial needle bearing 128, which stresses second thrust washer 132 axially accordingly. Second thrust washer 132 supports itself, in the area of axial support surface 142, axially on carrier 126, which in turn supports itself axially in the area of housing support surface 146 on actuator housing 44.

Thrust washers 130 and 132 and axial needle bearing 128 lying between thrust washers 130 and 132 are in recess 148 with a certain axial play and in recess 152 with a certain axial play. At the base of recess 152, thrust washers 132 and 130, and naturally also axial needle bearing 128, have a certain play so that the corresponding rotation capabilities that have been discussed are made possible.

As explained, axial/radial bearing unit 116 is designed in such a way that it has carrier 126 that is open on one side, in which only one axial needle bearing 128 and only two thrust washers 130 and 132 are necessary.

In contrast, in the designs according to the state of the art (possibly in-house state of the art of the applicant, so the applicant reserves the right to further protection) such bearings are installed in such a way that they require two axial needle bearings and three thrust washers. In the designs known from the state of the art, three thrust washers are arranged so that they are at a distance from each other axially. In the known state of the art, the thrust washers that lie on the outside axially are coupled to the bearing shell and in this case, the thrust washer lying in the center is coupled to spindle 112 or vice versa.

Figure 10:
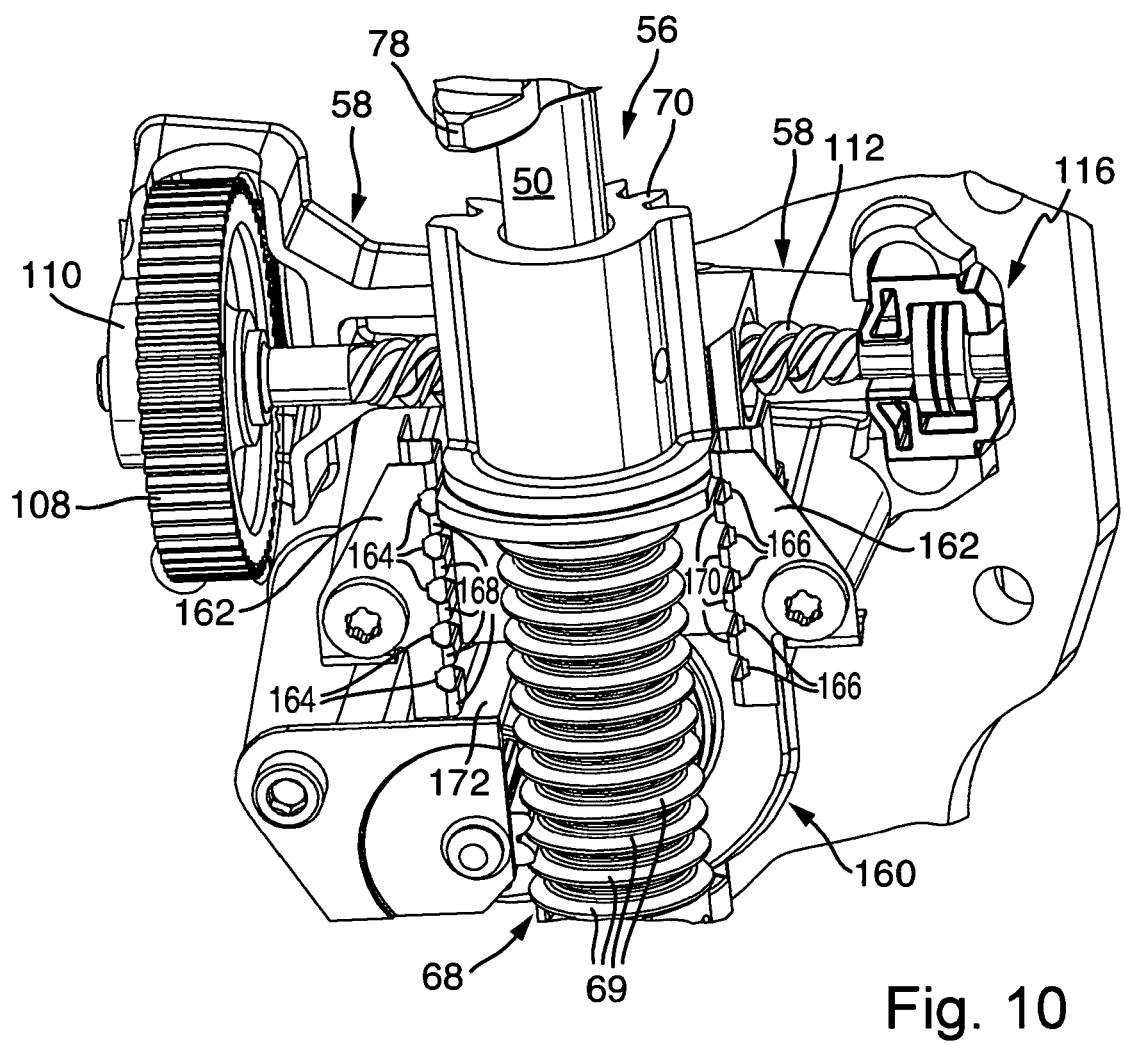

FIG. 10 shows an enlarged cutout from FIG. 3 in slightly turned form. In FIG. 10, among other things, a device and components are shown that ensure a referencing of the shifting diagram inside the actuator and form a shift gate. Device 160 to allow a referencing and to form a shift gate is shown in FIG. 10. Device 160 has projection 72 that was already discussed that is fastened on actuating module 56 and gearshift shaft 50.

Device 160 also has two second plates 162. Second plates 162 are fastened on drive module 58. It can be provided that plates 162 are mounted on actuator housing 44. Second plates 162 extend to the radially opposite sides of gearshift shaft 50. It can be provided that these sections that are arranged on radially opposite sides of gearshift shaft 50 are connected to form one piece so that there is second plate 162. However, it can also be provided that these—as pictured above—are separate second plates 162. In the following, primarily two second plates 162 will discussed without ruling out the option that these can be designed as a second plate.

Several windows 164 and 166 are provided in second plates 162. It should be noted that instead of second plates 162, other parts, especially parts of actuator housing 44, plates or also less flat components can also be provided in which windows 164 and 166 or recesses are provided.

In the following, however, windows 164 and 166 will be discussed for the sake of simplification, wherein it should be noted that these can especially be passages and that instead of this corresponding recesses can also be provided.

The spacing and the number of windows 164 and 166 are determined by the design of shift rails 28, 30, 32 and 34. In particular, the spacing of windows 164 and 166 is dependent on the spacing of shift rails 28, 30, 32 and 34 (with respect to each other).

Depending on the rotation direction of actuating module 56 and gearshift shaft 50, projection 72 can swivel into windows 164 and 166, as long as these are the same height and on the same plane in axial direction of gearshift shaft 50 and actuating module 56 as associated window 164 and 166. In areas 168 and 170 between windows 164 and 166, no rotation of actuating module 56 and gearshift shaft 50 is possible. Likewise, no height adjustment in axial direction of gearshift shaft 50 and of actuating module 56 is possible and a selection is not possible if projection 72 is swiveled into windows 164 and 166. By using this limit and the electronic control unit that is not shown and is preferably present, the shift diagram can be realized.

Projection 72—as FIG. 10 shows—is designed in such a way that its radially outer limit has two parallel sections that are assigned to opposite sides of gearshift shaft 50 and that are connected at one of their ends on the outside by way of an arc. The sections of second plates 162 turned toward each other are also designed so that they are essentially flat and interrupted by windows 164 and 166 discussed.

For axial limitation of the adjustment capability of gearshift shaft 50 and actuating module 56, stop 172 is provided that can also be used for referencing. In an especially advantageous design—which is not shown in the figures—alternatively the components for referencing the shifting diagram and for producing a shift gate are arranged between transmission housing 88 and actuating module 56. For example, to do this it can also be provided that device 160 that makes it possible to reference the shifting diagram and produce a shift gate is designed in another manner, as shown in FIG. 10.

As shown, according to the invention and according to the embodiment example, a unit is especially provided for automated selecting and shifting of gears in the transmission, which consists of a separate drive unit and a separate actuating unit and corresponding modules. The invention and the design previously shown in the scope of the embodiment example makes possible better utilization of open spaces in the vehicle, which e.g., and especially applies if due to the construction space relationships in the transmission and in adjacent parts of the construction space, they are occupied by other components in the engine compartment (of the motor vehicle) with the design arrangement of actuator housing 444 according to FIG. 1. In certain applications, it can be advantageous that with the invention, in comparison to the design according to FIG. 1, it is possible to maintain the gearshift shaft and function. In addition, the design explained using the figures offers the possibility of uncoupling a function unit of the gear actuator corresponding to actuator housing 444 from FIG. 1 and to mount it as a separate unit on the side (on the left according to the illustration in FIG. 1).

REFERENCE CHARACTER LIST 1 3-Shaft transmission
10 Drive shaft
12 First main shaft
14 Second main shaft
16 Driven shaft
18 Wheel set
20 Wheel set
22 Wheel set
24 Wheel set
26 Internal gear shift
28 Shift rail
30 Shift rail
32 Shift rail
34 Shift rail
42 Gear actuator
44 Actuator housing
44a Plate-shaped continuation of 44
46 Shifting motor
48 Selecting motor
50 Gearshift shaft of 56
56 Actuating module
58 Drive module
60 Arrow (assembly direction of 56)
62 Arrow (assembly direction of 58)
64 Kinematic interface for shifting
66 Kinematic interface for selecting
68 Rack of 56
69 Teeth of 68
70 Gear segment of 56
72 Projection of 56
74 Actuating element
76 Auxiliary actuating element
78 Main actuating element
80 Actuating element
82 Main actuating element
84 Auxiliary actuating element
86 Actuating element
88 Transmission housing
89 First through-hole in 44a
90 First drive gearing of 48
91 Centering pins
92 first internally geared wheel
93 Second through-holes in 44a for holding 91
94 first spur wheel continuation of 92
96 Pin
98 first plate
100 Shift kinematics
101 Selection kinematics
102 Second drive gearing of 46 of 100
104 Second internally geared wheel of 100
106 Second spur wheel continuation of 104
108 Spur wheel of 100
110 Bearing component of 100
112 Spindle of 100
114 Rack of 100
116 Axial/radial bearing unit of 100

118 Spindle nut
120 Adapter component
122 Frame
124 Frame
125 Longitudinal extension of motor output shaft of 46
126 Plastic carrier of 116
128 Axial needle bearing of 116
130 First thrust washer of 116
132 Second thrust washer of 116
134 Sleeve of 116
136 Groove in 112 of 116
138 Radial bearing running surface of 116
140 Axial support surface of 116
142 Axial support surface of 116
144 Housing support surface of 116
146 Housing support surface of 116
148 Recess of 112 and 134
150 Shoulder of 112
152 Recess in 126
154 Arrow
156 Arrow
160 Device to allowing a referencing and for forming a shift gate
162 second plate
164 Window
166 Window
168 Area between 164
170 Area between 166
172 Stop
400 3-Shaft transmission
410 Drive shaft
412 First main shaft
414 Second main shaft
416 Driven shaft
418 Wheel set
420 Wheel set
422 Wheel set
424 Wheel set
426 Internal gear shift
428 Shift rail
430 Shift rail
432 Shift rail
434 Shift rail
436 Shift rail pair
440 Shift rail
442 Gear actuator system
444 Actuator housing
446 Motor
448 Motor
450 Gearshift shaft
452 Actuating element
454 Actuating element
488 Transmission housing

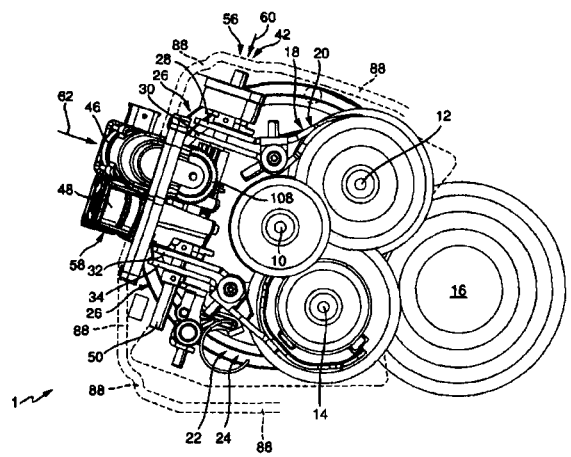

What is claimed is:

1. A transmission device for motor vehicles, comprising: a plurality of wheel sets (18, 20, 22, 24) for forming gears, wherein said transmission device (1) has an internal gear shift (26) for engaging and disengaging gears and a gear actuator (42) for actuating said internal gear shift (26), wherein said transmission device (1) has a transmission housing (88) in which said plurality of wheel sets (18, 20, 22, 24) provided for forming gears are held, characterized in that said gear actuator (42) has a first and a second function module, said first function module is a drive module (58) and said second function module is an actuating module (56), wherein said drive module (58) has at least one electronically-controlled drive device, and wherein a first kinematic interface for shifting and a second kinematic interface, separate from the first kinematic interface, for selecting are provided in the transmission device between the actuating module (56) and said drive module (58) such that during engaging and disengaging gears, said actuating module (56) is in a power flow between said drive module (58) and said internal gear shift (26) and said actuating module (56) and said drive module (58) are mounted separately on said transmission housing (88).

2. The transmission device according to claim 1, wherein said actuating module (56) further comprises a gear segment (70), by which forces for shifting can be transferred from said drive module (58) to said actuating module (56) and a first rack (68), by which forces for selecting can be transferred from said drive module (58) to said actuating module (56), and a plurality of actuating elements (74, 76, 78, 80, 82, 84, 86), by which forces for engaging and disengaging gears can be transferred from said actuating module (56) to said internal gear shift (26).

3. The transmission device according to claim 2, wherein said drive module (58) further comprises a gearshift shaft (50) that holds said gear segment (70), said first rack (68) and said plurality of actuating elements (74, 76, 78, 80, 82, 84, 86).

4. The transmission device according to claim 1, wherein said drive module (58) for providing actuating forces for shifting that act on said actuating module (56) further comprises a shifting motor (46), wherein said shifting motor (46) has a motor output shaft with a second drive gearing (102) and an second internally geared wheel (104) that has a second spur wheel continuation (106), a spur wheel (108), a spindle (112), a second rack (114) and a spindle nut (118) provided with a second rack (114), wherein a bearing component (110) is provided for mounting said spindle (112) and an axial/radial bearing unit (116) is provided for mounting said spindle (112).

5. The transmission device according to claim 4, wherein said second drive gearing (102) provided on said motor output shaft of said shifting motor (46) engages into said second internally geared wheel (104), and said second spur wheel continuation (106), provided on said second internally geared wheel (104), engages into said spur wheel (108), wherein said spur wheel (108) is mounted on said spindle (112) whereby said spur wheel (108) turns with said spindle (112) and said spindle (112) is mounted whereby said spindle (112) can turn in rotation and is fixed axially, said second rack (114) and said spindle nut (118) provided with said second rack (114) is arranged on said spindle (112) for mounting said spindle (112), wherein said spindle (112) has a first and a second side, and said bearing component (110) is provided on said first side of said spindle (112) and said axial/radial bearing unit (116) is provided on said second side of said spindle (112).

6. The transmission device according to claim 4, wherein said second rack (114) engages into a gear segment of said drive module (58).

7. The transmission device according to claim 1, wherein said actuating (56) module for providing actuating forces for selecting that act on said drive module (58) further comprises a selecting motor (48), wherein said selecting motor has a motor output shaft with a first drive gearing (90) and a first internally geared wheel (92) provided with a first spur wheel continuation (94), an pin (96) to hold said first internally geared wheel (92), and also a first plate (98) for forming a bearing point for said pin (96).

8. The transmission device according to claim 7, wherein said first drive gearing (90) provided on said motor output shaft of said selecting motor (48) engages into said first internally geared wheel (92), wherein an actuator housing (44) is provided, the pin (96) is tightly connected at its end area, wherein it is especially provided that said pin (96) is pressed into said actuator housing (44) for creating this fixed connection and another end area of said pin (96) are held for mounting said first plate (98), wherein said first internally geared wheel (92) is held by said pin (96) between these two end areas of said pin (96).

9. The transmission device according to one of claims 7, wherein said first spur wheel continuation (94) of said first internally geared wheel (92) engages in a first rack (68) of said actuating module (56).

10. The transmission device according to claim 1, wherein between said drive module (58) and said actuating module (56), a device (160) is provided to permit a referencing and for forming a shift gate.

11. The transmission device according to claim 1, wherein said drive module (58) further comprises a first electronically-controlled drive device for creating drive movements for selecting, and has a second electronically-controlled drive device for creating drive movements for shifting.

12. A transmission device for motor vehicles, comprising:
a plurality of wheel sets (18, 20, 22, 24) for forming gears, wherein said transmission device (1) has an internal gear shift (26) and a gear actuator (42) for actuating the internal gear shift (26) for engaging and disengaging gears, said gear actuator also has a spindle (112) that is mounted so that it can rotate, wherein said spindle (112) holds a spindle nut (118) and a second rack (114) that can be driven by means of said spindle (112) and an electric motor (46), by means of which said spindle (112) can be driven, characterized in that said spindle (112) is arranged at a distance perpendicular to a longitudinal extension direction (125) and essentially parallel to a motor output shaft of an electric motor (46) by means of which said spindle (112) can be driven.

13. A transmission device for motor vehicles, comprising:
a plurality of wheel sets (18, 20, 22, 24) for forming gears and said transmission device (1) has an internal gear shift (26) as well as a gear actuator (42) for actuating said internal gear shift (26) for engaging and disengaging gears and whereby said transmission device (1) has a transmission housing (88) in which said plurality of wheel sets (18, 20, 22, 24) provided for forming gears are held, wherein an actuator housing (44) is also provided in which said gear actuator (42) is at least partially held, characterized in that a bearing component (110) is provided that is fastened to at least one of said transmission and actuator housings (44, 88), wherein said transmission housing (88) and said actuator housing (44) provide a bearing point for a spindle (112) that is at a distance from limit walls of said transmission housing (88) and from limit walls of said actuator housing (44), by which said spindle (112) is held.

14. The transmission device according to claim 13, further comprising an adapter component (120), wherein said adapter component provides a means by which said bearing component (110) is adjusted to and positioned on said actuator housing (44).

15. A transmission device for motor vehicles, comprising:
a plurality of wheel sets (18, 20, 22, 24) for forming gears and said transmission device (1) has an internal gear shift (26) as well as a gear actuator (42) for actuating said internal gear shift (26) for engaging and disengaging gears, wherein said gear actuator (42) has a spindle (112) that is mounted whereby said gear actuator (42) can rotate and by which a spindle nut (118) is held, whereby said spindle (112) is mounted by means of an axial/radial bearing unit (116), characterized in that said axial/radial bearing unit (116) has a carrier (126) and exactly one axial needle bearing (128) and exactly two thrust washers (130, 132), wherein said carrier (126) is plastic and open on one side.

16. A transmission device for motor vehicles, comprising:
a plurality of wheel sets (18, 20, 22, 24) for forming gears and said transmission device (1) has an internal gear shift (26) as well as a gear actuator (42) for actuating said internal gear shift (26) for engaging and disengaging gears, wherein an actuator housing (44) is also provided, by which said gear actuator (42) is at least partially held and said gear actuator (42) has an internally geared wheel (92) that is mounted so said internally geared wheel (92) can rotate, characterized in that for mounting said internally geared wheel (92) so it can turn, a pin (96) is provided, one first end area of which is held tightly by said actuator housing (44) and especially is pressed into said actuator housing (44), whereby a (first) plate (98) is also provided that is axially and radially fixed on said actuator housing (44) with respect to an axis of rotation of said internally geared wheel (92), which provides a bearing point for another second end area of said pin (96), on which said pin (96) is mounted, whereby said internally geared wheel (92) is held by said pin (96) between said first and second end areas of said pin (96).

17. The transmission device according to claim 1, wherein said transmission device (1) is a 3-shaft transmission device.

18. The transmission device according to claim 1, wherein said gear actuator (42) is comprised of a drive module (58) and an actuating module (56).

19. The transmission device according to claim 4, wherein said axial/radial bearing unit (116) has exactly one axial needle bearing (128) and exactly two thrust washers (130, 132).

20. The transmission device according to claim 19, wherein said axial/radial bearing unit (116) also has a carrier (126) that is plastic and open on one side.

21. A method for manufacturing a transmission device for a motor vehicle, wherein said transmission device is a 3-shaft transmission device, whereby said transmission device (1) has a plurality of wheel sets (18, 20, 22, 24) for forming gears and said transmission device (1) has an internal gear shift (26) as well as a gear actuator (42) for actuating said internal gear shift (26) for engaging and disengaging gears, wherein said transmission device (1) has a transmission housing (88) in which said plurality of wheel sets (18, 20, 22, 24) provided for forming gears are held, comprising:
manufacturing an actuating module (56);
manufacturing a drive module (58);
installing said actuating module (56) on said transmission housing (88);
installing said drive module (58) on said transmission housing (88); and,
providing, in the transmission device between the actuating module (56) and said drive module (58), a first kinematic interface for shifting and a second kinematic interface, separate from the first kinematic interface, for selecting wherein said drive module (58) and said actuating module (56) are each mounted on said transmission housing (88) at respective different locations on transmission housing (88), and said drive module (58) and said actuating module (56) are components of said gear actuator (42).

22. The method according to claim 21, wherein said actuating module (56) is installed on said transmission housing (88) before said drive module (58).

23. The method according to one of claims 21, wherein an assembly direction of said drive module (58) is aligned at an angle that is essentially perpendicular to an assembly direction of said actuating module (56).

* * * * *

UNITED STATES PATENT AND TRADEMARK OFFICE
CERTIFICATE OF CORRECTION

| | |
|---|---|
| PATENT NO. | : 7,779,713 B2 |
| APPLICATION NO. | : 11/482259 |
| DATED | : August 24, 2010 |
| INVENTOR(S) | : Matthias Ehrlich |

It is certified that error appears in the above-identified patent and that said Letters Patent is hereby corrected as shown below:

Column 23, claim 10 should read:
10. The transmission device according to Claim 8, wherein said first spur wheel continuation (94) of said first internally geared wheel (92) engages in a first rack (68) of said actuating module (56).

Column 26, claim 24 should read:
24. The method according to Claim 22, wherein an assembly direction of said drive module (58) is aligned at an angle that is essentially perpendicular to an assembly direction of said actuating module (56).

Signed and Sealed this
Twenty-ninth Day of May, 2012

David J. Kappos
*Director of the United States Patent and Trademark Office*

UNITED STATES PATENT AND TRADEMARK OFFICE
CERTIFICATE OF CORRECTION

PATENT NO. : 7,779,713 B2
APPLICATION NO. : 11/482259
DATED : August 24, 2010
INVENTOR(S) : Matthias Ehrlich It is certified that error appears in the above-identified patent and that said Letters Patent is hereby corrected as shown below:

Delete the title page and substitute therefore the attached title page showing the corrected number of claims in patent.

Column 23, lines 13-16, claim 10 should read:
10. The transmission device according to Claim 8, wherein said first spur wheel continuation (94) of said first internally geared wheel (92) engages in a first rack (68) of said actuating module (56).

Column 26, line 3, insert claim 24 as follows:
--24. The method according to Claim 22, wherein an assembly direction of said drive module (58) is aligned at an angle that is essentially perpendicular to an assembly direction of said actuating module (56).--

This certificate supersedes the Certificate of Correction issued May 29, 2012.

Signed and Sealed this
Nineteenth Day of June, 2012

David J. Kappos
*Director of the United States Patent and Trademark Office*

(12) United States Patent
Ehrlich et al.

(10) Patent No.: US 7,779,713 B2
(45) Date of Patent: Aug. 24, 2010

(54) TRANSMISSION DEVICE FOR MOTOR VEHICLES, GEAR ACTUATOR, AXIAL/RADIAL BEARING UNIT, AND PROCESS FOR MANUFACTURING A MOTOR VEHICLE TRANSMISSION DEVICE

(75) Inventors: Matthias Ehrlich, Buehl (DE); Norbert Esly, Buehl (DE)

(73) Assignee: LuK Lamellen und Kupplungsbau Bateiligungs KG, Buehl (DE)

(*) Notice: Subject to any disclaimer, the term of this patent is extended or adjusted under 35 U.S.C. 154(b) by 805 days.

(21) Appl. No.: 11/482,259

(22) Filed: Jul. 7, 2006

(65) Prior Publication Data
US 2007/0017311 A1 Jan. 25, 2007

(30) Foreign Application Priority Data
Jul. 8, 2005 (DE) .............. 10 2005 0032 006

(51) Int. Cl.
F16H 3/06 (2006.01)
F16H 27/02 (2006.01)
F16H 29/02 (2006.01)
F16H 29/20 (2006.01)
F16H 59/00 (2006.01)
F16H 61/00 (2006.01)
F16H 63/00 (2006.01)

(52) U.S. Cl. .............. 74/335; 74/89.23; 74/473.12
(58) Field of Classification Search ............... 74/335, 74/89.23, 473.12
See application file for complete search history.

(56) References Cited
U.S. PATENT DOCUMENTS

| | | | | |
|---|---|---|---|---|
| 5,992,254 A * | 11/1999 | Machado | ............ | 74/335 |
| 6,286,380 B1 * | 9/2001 | Imao et al. | ............ | 74/335 |
| 6,378,393 B1 * | 4/2002 | Bates | ............ | 74/473.18 |
| 6,470,764 B1 * | 10/2002 | Yamaguchi et al. | ............ | 74/335 |
| 7,026,770 B2 * | 4/2006 | Hemphill et al. | ............ | 318/9 |
| 7,222,554 B2 * | 5/2007 | Hayashi et al. | ............ | 74/473.12 |
| 7,435,924 B2 * | 10/2008 | Schmitt-Walter et al. | .. | 219/86.33 |

FOREIGN PATENT DOCUMENTS

DE 102 06 561 10/2002
DE 103 16 434 10/2003

OTHER PUBLICATIONS

Translation to DE 10316434.*
Translation to DE 10316434 May 13, 2009.*

* cited by examiner

Primary Examiner—Tisha D Lewis
(74) Attorney, Agent, or Firm—Simpson & Simpson, PLLC

(57) ABSTRACT

The invention relates to a transmission device for motor vehicles, wherein the transmission device has several wheel sets for forming gears and wherein the transmission device has an internal gear shift and a gear actuator for actuating the internal gear shift for engaging and disengaging gears, and wherein the transmission device has a transmission housing in which the wheel sets provided for forming gears are held, wherein the gear actuator has two separate function modules, of which a first one is a drive module and of which a second is an actuating module, wherein the drive module has at least one, especially electronically-controlled, drive device like an electric motor and wherein during engaging and disengaging gears, the actuating module is in the power flow between the drive module and the internal gear shift and wherein the actuating module and the drive module are mounted separately on the transmission housing.

24 Claims, 7 Drawing Sheets